US009634807B2

(12) United States Patent
Kerhuel

(10) Patent No.: US 9,634,807 B2
(45) Date of Patent: Apr. 25, 2017

(54) JOINT USER DETECTION APPARATUS

(71) Applicant: Samuel Kerhuel, Villeneuve Tolosane (FR)

(72) Inventor: Samuel Kerhuel, Villeneuve Tolosane (FR)

(73) Assignee: NXP USA, INC., Austin, TX (US)

( * ) Notice: Subject to any disclaimer, the term of this patent is extended or adjusted under 35 U.S.C. 154(b) by 172 days.

(21) Appl. No.: 14/702,818

(22) Filed: May 4, 2015

(65) Prior Publication Data

US 2016/0157222 A1 Jun. 2, 2016

(30) Foreign Application Priority Data

Dec. 2, 2014 (WO) .................. PCT/IB2014/003039

(51) Int. Cl.
*H04W 24/00* (2009.01)
*H04W 80/04* (2009.01)
(Continued)

(52) U.S. Cl.
CPC ......... *H04L 5/0007* (2013.01); *H04B 7/0857* (2013.01); *H04J 13/0059* (2013.01)

(58) Field of Classification Search
CPC . H04W 72/0413; H04W 24/00; H04W 80/04; H04W 74/0004; H04L 5/0007;
(Continued)

(56) References Cited

U.S. PATENT DOCUMENTS

2007/0263579 A1* 11/2007 Ozluturk ............. H04W 74/004
370/338
2009/0202021 A1* 8/2009 Cheng ................... H04L 1/0027
375/317
(Continued)

FOREIGN PATENT DOCUMENTS

EP 2645604 A1 10/2013

OTHER PUBLICATIONS

Lyashev, V.; Oseledets, I.; Zheng, D., "Tensor-based multiuser detection and intra-cell interference mitigation in LTE PUCCH," Telecommunications Forum (TELFOR), 2013 21st , vol., No., pp. 385,388, Nov. 26-28, 2013.
(Continued)

*Primary Examiner* — Andrew Lee

(57) ABSTRACT

A joint user detection apparatus for a wireless communication system, such as OFDM systems, arranged to account for timing impairments experienced by CAZAC codes.
The proposed apparatus brings improvements over conventional receiving apparatuses by allowing joint user channel estimation processing and joint user equalization processing while considering timing impairments of user associated information present within a symbol of a received signal. The proposed solution could be used on conventional receiving apparatuses since both joint user channel estimation processing and joint user equalization processing can be activated independently such that either one or both improvements may be activated as needed or as required by the design of the conventional receiving apparatuses.
A method and a computer program are also claimed.

15 Claims, 3 Drawing Sheets

(51) Int. Cl.
*H04L 5/00* (2006.01)
*H04J 13/00* (2011.01)
*H04B 7/08* (2006.01)

(58) Field of Classification Search
CPC ............. H04L 27/2601; H04L 27/3854; H04L 5/0048; H04L 27/2659
See application file for complete search history.

(56) References Cited

U.S. PATENT DOCUMENTS

| | | | |
|---|---|---|---|
| 2009/0252112 A1* | 10/2009 | Shimomura | H04L 5/0007 370/330 |
| 2010/0027723 A1* | 2/2010 | Kim | H04L 27/2657 375/343 |
| 2011/0026649 A1* | 2/2011 | Lipka | H04L 27/2659 375/343 |
| 2012/0163499 A1* | 6/2012 | Kim | H04L 27/3854 375/298 |
| 2012/0320872 A1* | 12/2012 | Yang | H04L 5/0048 370/330 |
| 2013/0016707 A1* | 1/2013 | He | H04L 1/0031 370/336 |
| 2014/0270024 A1 | 9/2014 | Papadimitriou | |
| 2014/0362701 A1* | 12/2014 | Roh | H03M 13/2966 370/235 |
| 2015/0256375 A1* | 9/2015 | Asjadi | H04L 27/2601 375/340 |

OTHER PUBLICATIONS

Da Silva, I.L.J., "Improved Data-Aided Channel Estimation in LTE PUCCH Using a Tensor Modeling Approach," IEEE International Conference on Communications; May 23-27, 2010, pp. 1-5.

* cited by examiner

JOINT USER DETECTION APPARATUS

CROSS REFERENCE TO RELATED APPLICATION(S)

The present application claims priority to International Patent Application No. PCT/IB2014/003039, entitled "JOINT USER DETECTION APPARATUS," filed on Dec. 2, 2014, the entirety of which is herein incorporated by reference.

FIELD OF THE INVENTION

This invention relates to a joint user detection apparatus, a method and a computer program for joint user detection for a communication system.

BACKGROUND OF THE INVENTION

In Long-Term Evolution (LTE) by the $3^{rd}$ Generation Partnership Project (3GPP), the Radio Access Network (RAN) is totally optimized for packet-oriented applications with low latency and high-peak rates. In order to guarantee that the packets are correctly delivered to the upper layers, LTE employs a combination of ARQ (Automatic Repeat Request) and FEC (Forward Error Correction), also known as Hybrid-ARQ, which must be fed back to a base station (e.g. eNodeB). In the uplink, the uplink control channel, called the physical uplink control channel (PUCCH), is associated with the transmission of CQI, Hybrid-ARQ acknowledgements and scheduling requests (SR). Within the PUCCH, multiple UEs can share the same time-frequency resources, the UEs being multiplexed via code division multiplexing (CDM) in the frequency domain and in the time domain, simultaneously. For CQI information, CDM is achieved by cyclically shifting a code exhibiting a constant amplitude zero autocorrelation (CAZAC) property. This is based on the fact that the cross-correlation is null among cyclically shifted CAZAC codes.

However, it has been demonstrated that orthogonality between CAZAC codes can be lost in OFDM systems such as LTE, which are sensitive to timing offset or timing error. The timing offset causes a linearly growing phase error within OFDM symbols.

SUMMARY OF THE INVENTION

The present invention provides an apparatus, a method and a computer program as described in the accompanying claims. Specific embodiments of the invention are set forth in the dependent claims. These and other aspects of the invention will be apparent from an elucidated with reference to the embodiments described hereinafter.

BRIEF DESCRIPTION OF THE DRAWINGS

Further details, aspects and embodiments of the proposed solution will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the proposed solution may for the most part, be composed of electronic components and circuits known to those skilled in the art, details will not be explained in any greater extent than that considered necessary for the understanding and appreciation of the underlying concepts of the subject application, in order not to obfuscate or distract from the teachings of the subject application. For a proper understanding of the subject application, the following detailed description will use decoding of a LTE Physical Uplink Control Channel (PUCCH) signal in its formats 2 as an example. iHowever, persons skilled in the art of communication systems will readily appreciate that the proposed solution may also be applied to LTE PUCCH signal in its format 2a/2b but also in its format 1/1a/1b (under certain conditions that will be explained later on) or other communication systems different from LTE and other channels different from the LTE PUCCH, at the receiver level.

First, for the sake of clarity, the purpose of the LTE PUCCH signal in its format 2 will be described. A UE (User Equipment) uses the PUCCH format 2 control information to relay an estimate of the channel properties to the base station (eNodeB) in order to aid channel dependent scheduling. Channel status reports include CQI (Channel Quality Indicator), PMI (Precoding Matrix Indicator) information and RI (Rank indicator) information. CQI information represents the recommended modulation scheme and coding rate that should be used for the downlink transmission. RI information provides information about the rank of the channel, which is used to determine the optimal number of layers that should be used for the downlink transmission (only used for spatial multiplexed systems). PMI information provides information about which precoding matrix to use (only used in closed loop spatial multiplexing systems).

Figure 1:
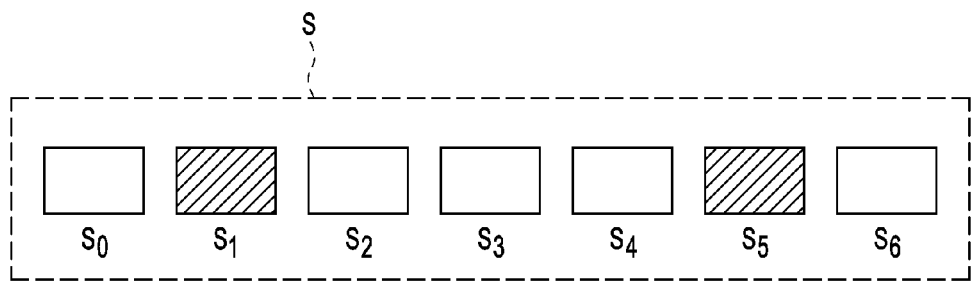
FIG. 1 is a schematic diagram of an example of a time-domain signal transmitted by a LTE PUCCH transmitter.

Secondly, the LTE PUCCH signal generation in its format 2 is described, by a LTE transmitter for instance. In a LTE PUCCH transmitter, the CQI information associated with an UE is encoded using an encoding unit such as a Reed-Muller encoder, thereby generating an encoded sequence. Later, a scrambling unit scrambles the encoded sequence into a scrambled sequence for the purpose of ensuring interference randomisation between cells. Further, a modulation unit (e.g. a BPSK/QPSK modulator) modulates the scrambled sequence into a modulated sequence. Later, for a particular UE, a code-spreading unit spreads the modulated sequence in the frequency domain across a plurality of subcarriers allocated to the LTE PUCCH signal, thereby generating a data frequency-spreaded sequence. The foregoing can be performed by multiplying in the frequency domain, the modulated sequence by a cyclically shifted version of a code exhibiting constant-amplitude zero autocorrelation (CAZAC) property in the frequency domain. In LTE, one CAZAC code is associated with a given cell. An example of a CAZAC code is a Zadoff-Chu (ZC) sequence and its associated cyclic shifts, is used for minimising cross-correlation between different UE signals in the same cell. Indeed, the cyclic auto-correlation of each ZC sequence results in a single Dirac impulse at time offset zero. Hence, where the LTE PUCCH signal comprises a plurality of UE information, each respective data frequency-spreaded sequence is associated and the respective CAZAC codes are orthogonally multiplexed in the frequency domain. Further, for a particular UE, a code-spreading unit spreads a pilot signal such as a demodulation reference signal (e.g. the Demodulation reference signal) in the frequency domain across a plurality of subcarriers allocated to the LTE PUCCH signal, thereby generating a pilot frequency-spreaded sequence. The foregoing can be performed by multiplying in the frequency domain, the pilot signal by a cyclically shifted version of a CAZAC code as already explained above. The pilot signal will be used for the purpose of channel estimation. It is to be noted that where the LTE PUCCH signal comprises a plurality of UE information, each respective pilot frequency-spreaded sequence is associated with a CAZAC code and their associated cyclic shifts which are orthogonally multiplexed in the frequency domain. Later, a resource mapping and Inverse Fast-Fourier Transform unit generates a time-domain signal based on the data frequency-spreaded sequence and the pilot frequency-spreaded sequence. Still further, a cyclic prefix addition unit adds a cyclic prefix to the time-domain signal, thereby creating a LTE PUCCH signal which can then be caused to enter a transmission channel such a wireless transmission channel, via one or more transmitting antennas, for instance. Thereinafter in the description, it will be considered that the generated LTE PUCCH signal comprises at least one data symbol and at least one pilot symbol wherein the data symbol corresponds to the data frequency-spreaded sequence along with the associated cyclic prefix and the pilot symbol corresponds to pilot frequency-spreaded sequence along with the associated cyclic prefix. Of course, the generated LTE PUCCH signal may comprise more than one pilot symbols and data symbols. For instance, in FIG. 1, there is shown therein an example of a LTE PUCCH signal S which comprises a plurality of symbols $s_0, s_1, s_2, s_3, s_4, s_5, s_6$. The LTE PUCCH signal S of FIG. 1 comprises five data symbols $s_0, s_2, s_3, s_4, s_6$ and two pilot symbols $s_1, s_5$. However, for the sake of clarity, it is reminded that in the following description only one data symbol and one pilot symbol would be considered in the generated LTE PUCCH signal. Further, it is to be further noted that each of the data and pilot symbols of the generated LTE PUCCH signal are orthogonally multiplexed in the time domain with a unique cyclically shifted version of a CAZAC code, as already explained above.

Thirdly, it will be described how the generated LTE PUCCH signal in its format 2 is received by a conventional LTE receiver, for instance. In a conventional LTE PUCCH receiver, after the generated LTE PUCCH signal passes through the transmission channel and is received, a cyclic prefix removing unit removes the cyclic prefix from the received signal. Later, a Fast-Fourier Transform and resource demapping unit generates a received data frequency-domain signal based on the data symbol of the received signal and also generates a received pilot frequency-domain signal based on the pilot symbol of the received time-domain signal. It is to be noted that where the LTE PUCCH signal comprises a plurality of pilot symbols and data symbols, the received data frequency-domain signal comprises all the data symbols of the received signal and the received pilot frequency-domain signal comprises all the pilot symbols of the received signal. Further, each of the received data frequency-domain signal and the received pilot frequency-domain signal comprises a channel estimate component which relates to the fact that the received signal has passed through the transmission channel. The channel estimate be different for each user of the received data frequency-domain signal and the received pilot frequency-domain or can be similar. The channel estimate component characterise the properties of the transmission channel. Further, a code-despreading unit despreads the received data frequency-domain signal from the frequency domain, thereby generating a data frequency-despreaded signal. The foregoing can be performed by multiplying the received data frequency-domain signal by the complex conjugate of the respective CAZAC code. It is to be noted that where the LTE PUCCH signal comprises a plurality of UE information, it generates a data frequency-despreaded signal for each UE based on the complex conjugate of the associated CAZAC code. Later, a conventional channel estimator calculates a channel estimation value of the transmission channel over which the signal was transmitted, based on the received pilot frequency-domain signal. Namely, it is generated a channel estimate value for a user (i.e. a UE) by multiplying the received pilot frequency-domain signal by the complex conjugate of the associated CAZAC code. It is to be noted that where the LTE PUCCH signal comprises a plurality of UE information, it is generated a channel estimate value for each UE based on the complex conjugate of the associated CAZAC code. Further, a conventional equalizing unit equalizes the data frequency-despreaded signal based on the conventional channel estimation value, thereby generating an equalized data frequency-despreaded signal. Still further, a demodulation unit demodulates the equalized data frequency-despreaded signal into a scrambled sequence. The foregoing can be performed, in a first step, by obtaining the modulated sequence by multiplying the equalized data frequency-despreaded signal by the complex conjugate of the channel estimation value generated by the conventional channel estimator unit. In a second step, it can be obtained the scrambled sequence by demodulating the obtained modulated sequence. Later, a descrambling unit descrambles the scrambled sequence into an encoded sequence. Finally, a decoding unit, such as a Reed-Muller decoder, decodes the encoded sequence into the CQI information associated with the UE To summarise, from the foregoing it can be readily appreciated that at the receiver level, channel estimation is performed based on the pilot symbol after it has been despreaded by the associated CAZAC code and equalization is performed based on the data symbol in combination with the determined channel estimate after that the data symbol has been despreaded by the associated CAZAC code. It is to be noted that CAZAC codes are known at the receiver and considered to be perfectly orthogonal, as already explained above. However, for a received signal such as the LTE PUCCH signal, CAZAC codes are only orthogonal under ideal conditions such that the associated symbols which may comprise user associated information (e.g. CQI, pilot information) originating from different users, can suffer from cross interference where such ideal conditions are not maintained. Cross interference tends for example to rise where users are desynchronized in time, for instance due to different time of arrival of the user associated information.

There are known techniques such as the "timing advance" which exist to compensate for timing errors (also known as timing offset). However, in practice such techniques are not perfect because of limited accuracy of the measurements errors due to thermal noise and interference, propagation time change due to user movement, oscillator drift, abrupt change of the multipath channel and misdetection of timing advance commands, for instance. In LTE for example, a native incompressible inherent timing error between −0.25 µs to 0.25 µs is always present since timing report from UE to eNB is expressed in approximatively 0.52 µs steps as defined in 3GPP standard. In a nutshell, it can be stated that timing errors are still present after such as "timing advance" are used. This is problematic because large cross interference can be experienced where the number of users and the associated timing errors are high. As a solution to this problem it is proposed to account for the timing errors associated with user information during channel estimation processing and/or equalization processing. Indeed, as it will be explained later, with the proposed solution, timing errors which have effects on the orthogonally of the CAZAC codes can be taken into account during joint user channel estimation processing alone, joint user equalization processing alone or during both processing.

In order to solve the above-mentioned problem, it is proposed to perform channel estimation based on the pilot symbol and the associated CAZAC code integrating the timing error associated with each user information. Equalization can for example be performed based on the data symbol, the channel estimate and the associated CAZAC code integrating the timing error associated with each user information to formulate and solve an equation representation of the relevant received signal integrating the timing error associated with each user information. Namely, channel estimation processing can be performed on one hand and equalization processing on the other hand, where all users of a particular symbol are jointly processed so that their mutual interference is taken into account in the corresponding equation.

For example, the following calculations may be performed. For channel estimation processing in the frequency domain, the following equation may be formulated to provide a mathematical representation of a a transmitted pilot signal:

$$y_{t,f,s,a} = \sum_{u=1}^{n_{UE}} \left( h_{u,a,s} \times CAZAC_{t,f,s,u} \times e^{j\theta_{f,u}} \right) \quad (1)$$

wherein:
y represents the received pilot frequency-domain signal;
h represents the communication channel to be estimated;
CAZAC represents the CAZAC code such as Zadoff-Chu sequence used for PUCCH multiplexing;
$e^{j\theta}$ represents the timing error associated with each user information, where $\theta=2\pi ft$. For instance, $e^{j\theta}=1$ could correspond to the case where there is no timing error experienced for a particular user;
t represents the symbol index, f is the subcarrier index, s is the slot index, a is the receiving antenna index, and u is the user index; and,
$n_{UE}$ represents the number of users present within one symbol.

For equalization processing in the frequency domain, the following equation may be formulated to provide a mathematical representation of a transmitted data symbol signal:

$$y_{t,f,s,a} = \sum_{u=1}^{n_{UE}} \left( d_{t,s,u} \times h_{u,a,s} \times CAZAC_{t,f,s,u} \times e^{j\theta_{f,u}} \right) \quad (2)$$

wherein:
y represents the received data frequency-domain signal;
d represents the equalized data frequency-despreaded signal to be estimated;
h represents the communication channel estimate;
CAZAC i represents s the CAZAC code such as Zadoff-Chu sequence used for PUCCH multiplexing;
$e^{j\theta}$ is the timing error associated with each user information where $\theta=2\pi ft$. For instance, $e^{j\theta}=1$ could correspond to the case where there is no timing error experienced for a particular user
t represents the symbol index, f is the subcarrier index, s is the slot index, a is the receiving antenna index, and u is the user index; and,
$n_{UE}$ represents the number of users present within one symbol.

In an embodiment, equations (1) and (2) may be represented in a matrix form as $$Y = A \times Z \quad (3)$$

wherein:
Y represents the matrix representation of the known received signal;
A represents the matrix representation of an unknown quantity to be estimated which is either a matrix representation of a channel estimate of the communication channel 200 over which the respective symbol has been transmitted or a matrix representation of a matrix representation of an equalized data frequency-despreaded signal; and,
Z represents the matrix representation of the CAZAC code integrating the timing error associated with each user information.

The equation (3) may be solved as:

$$A = Y \times Z^{-1} \quad (4)$$

wherein $(\cdot)^{-1}$ denotes an inverse matrix operator.

To summarize, it is proposed to perform channel estimation based on the pilot symbol and the associated CAZAC code integrating the timing error associated with each user information. Further, it is proposed to perform equalization based on the data symbol, the channel estimate and the associated CAZAC code integrating the timing error associated with each user information.

Figure 2:
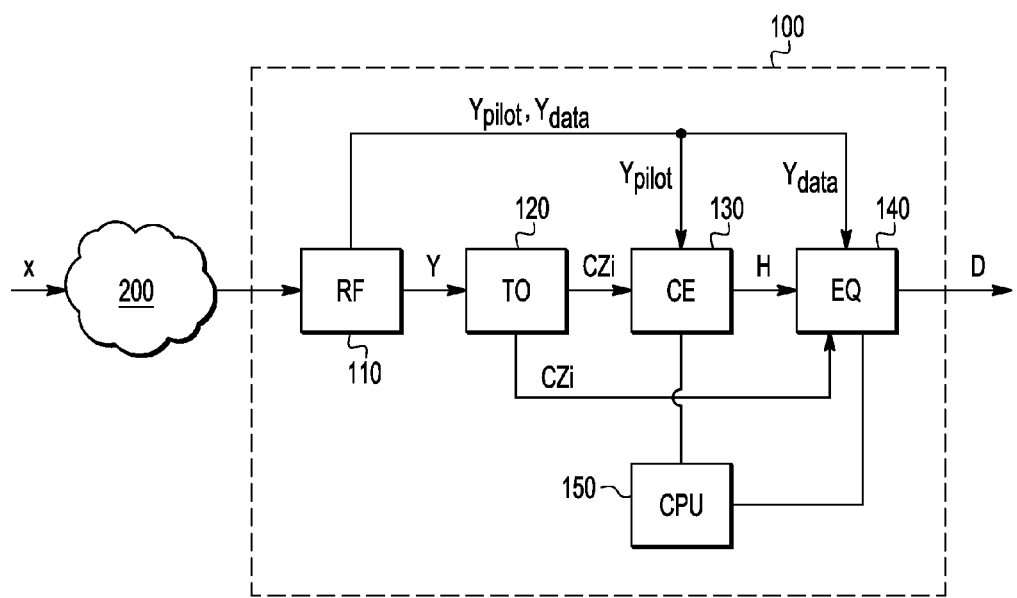
FIG. 2 is an example of a wireless reception chain comprising a joint user detection apparatus in some examples.

Referring now to FIG. 2, there is diagrammatically shown therein an example of a wireless reception chain comprising a receiving apparatus 100. In FIG. 2, the receiving apparatus comprises:
a receiving unit such as a Radio Frequency (RF) receiver 120, arranged to receive a signal transmitted over a channel of a wireless communication system;
a timing offset estimation unit 120 such as a time tracking estimator, arranged to estimate the timing error (also known as timing offset) associated with each user information comprised in a received signal;
a channel estimation unit such as a time-frequency interpolator or a channel estimator 130, arranged to produce in the frequency domain, a channel estimation data associated with a channel response estimation of a channel;
an equalizing unit 140 such as those which are normally encountered in communication systems, arranged to produce in the frequency domain, an equalized data symbol associated with a data symbol; and,
a processing unit such as a processor 150.

In FIG. 2, a communication channel 200 is operably coupled to the receiving apparatus 100. The receiving unit 110 is operably coupled to the timing offset estimation unit 120, the latter being operably coupled to the channel estimation unit 130 and to the equalizing unit 140. The channel estimation unit 130 is operably coupled to the receiving unit 110 and to the equalizing unit 140, the latter being operably coupled to the receiving unit 110. The processing unit 150 is operably coupled to the channel estimation unit 130 and the equalizing unit 140. In embodiments, the receiving unit 110, the timing offset estimation unit 120, the channel estimation unit 130 and/or the equalizing unit 140 are arranged to perform matrix operations over vectors and matrices. The skilled person would appreciate that the receiving apparatus 100 which is a joint user detection apparatus as already explained above, may further comprise a decoder (not shown) such as the Reed-Muller decoder comprised in the conventional receiving apparatus.

In embodiments, the receiving unit 110 comprises:
one or more receiving antennas (not shown) arranged to receive a signal;
a cyclic prefix removing unit (not shown) such as a signal processing unit, arranged to remove a cyclic prefix from symbol(s) of the received signal; and,
a Fast-Fourier Transform (FFT) and resource demapping unit (not shown) such as a FFT transformer, arranged to generate:
a received data frequency-domain signal based on a data symbol(s) of the received signal with cyclic prefix removed; and,
a received pilot frequency-domain signal based on a pilot symbol(s) of the received signal with cyclic prefix removed.

In the example of FIG. 2, after a LTE PUCCH signal x has passed through the communication channel 200, it is received, at the receiving unit 110, a signal which is associated with a matrix Y which is of size N×M, where N corresponds to the number of receiving antenna(s) of the receiving unit 110 and M corresponds to the number of subcarriers comprised in one symbol of the received signal. Namely, the matrix Y is associated with one symbol of the signal obtained at the receiving unit 110 in response to transmission of the LTE PUCCH signal x over the communication channel 200. As already explained above, the LTE PUCCH signal x comprises at least one data symbol and at least one pilot symbol, each symbol comprising one or more user associated information which are orthogonally multiplexed in the time domain with a unique cyclically shifted version of CAZAC code known at the receiving apparatus 100 level. This enables the transmission of multiple user associated information at the same time (e.g. subframe) on the same or overlapping subcarriers within one symbol. In the example of FIG. 2, the receiving unit 110 is arranged to produce, based on the matrix Y, a matrix $Y_{data}$ associated with the received data frequency-domain signal and a matrix $Y_{pilot}$ associated with the received pilot frequency-domain signal. In the example of FIG. 2, $Y_{data}$ is associated with one data symbol of the received data frequency-domain signal and $Y_{pilot}$ is associated with one pilot symbol of the received pilot frequency-domain signal.

In embodiments, the timing offset estimation unit 120 is similar to timing offset apparatuses which are normally encountered in a wireless communication system such as orthogonal frequency-division multiplexing (OFDM), for instance. The the timing offset estimation unit 120 can run on different channel on different subframes. Further, the estimation could be done at a very slow rate if the timing error is slow varying. It is known that OFDM system is sensitive to timing offset, also known as timing error. Timing offset causes a linearly growing phase error of the subcarrier samples within OFDM symbol and introduces a loss of orthogonally of the CAZAC codes. The timing offset estimation unit 120 is arranged to estimate and track closely the correct timing of the arriving OFDM symbols. In an example embodiment of the timing offset estimation unit 120, for an LTE system, the timing offset may be estimated based on a reference signal (also known as pilot), such as for example, PUSCH DMRS or Sounding Reference Signal (SRS). United States Patent application publication US 20140270024 A1 describes an example of a method of calculating a timing offset estimate based on a received reference signal. It is clear that reference signals are present on numerous communication channels such as the LTE PUCCH signal x or the LTE Physical Uplink Shared Channel (PUSCH) signal. Therefore, a timing offset estimation data can be obtained from the LTE PUCCH signal x but also from others LTE signals such as the LTE PUSCH signal. In the latter case, the timing offset estimate may be more reliable than the one obtained from the LTE PUCCH signal x if it is assumed that the timing of each user is slow varying, since the LTE PUSCH is typically more reliable than the PUCCH. Indeed, the LTE PUSCH typically comprises more pilots resource elements where less users multiplexed together and can operate at higher SNR (Signal to Noise Ratio). In the example of FIG. 2, the timing offset estimation unit 120 is arranged to determine a timing offset estimation data associated with timing impairment of user associated information comprised in the LTE PUCCH signal x, based on the matrix Y. According to embodiments, the timing offset estimation unit 120 is further arranged for each symbol of the received signal, to integrate the determined timing offset estimation data with the respective CAZAC code, thereby producing an integrated CAZAC code (CZi). In an example, with reference to equations (1) and (2), CZi corresponds to a matrix representation of a product between a user associated CAZAC code and the respective determined timing offset (e.g. $CAZAC_{t,f,s,u} \times e^{j\theta_{f,u}}$).

In embodiments, the channel estimation unit 130 is arranged to operate in a first mode, as the conventional channel estimator, as already explained above, so as to produce a channel estimation data associated with a channel response estimation of the communication channel 200. However, in some examples, the channel estimation unit 130 is further arranged to operate in a second mode so as to produce, based on at least the matrix $Y_{pilot}$ and the matrix CZi, a channel estimation data representing a channel estimation matrix H which is associated with a channel response estimation of the communication channel 200. The matrix H is of size N×U, wherein the given number U corresponds to the number of simultaneous users present within a symbol of the received signal. Thereinafter, it will be considered that four users are considered, such that U=4. Based on the foregoing and in accordance with the equation (3), the channel estimation unit 130 in the second mode of operation is arranged to solve, for one symbol in a slot, the following equation:

$$\begin{bmatrix} y_{1,1} & y_{2,1} & \cdots & y_{12,1} \\ y_{1,2} & y_{2,2} & \cdots & y_{12,2} \end{bmatrix} = \begin{bmatrix} h_{1,1} & h_{2,1} & h_{3,1} & h_{4,1} \\ h_{1,2} & h_{2,2} & h_{3,2} & h_{4,2} \end{bmatrix} \times \begin{bmatrix} Z_{1,1}e^{j\theta_{1,1}} & Z_{2,1}e^{j\theta_{2,1}} & \cdots & Z_{12,1}e^{j\theta_{12,1}} \\ Z_{1,2}e^{j\theta_{1,2}} & Z_{2,2}e^{j\theta_{2,2}} & \cdots & Z_{12,2}e^{j\theta_{12,2}} \\ Z_{1,3}e^{j\theta_{1,3}} & Z_{2,3}e^{j\theta_{2,3}} & \cdots & Z_{12,3}e^{j\theta_{12,3}} \\ Z_{1,4}e^{j\theta_{1,4}} & Z_{2,4}e^{j\theta_{2,4}} & \cdots & Z_{12,4}e^{j\theta_{12,4}} \end{bmatrix} \quad (5)$$

wherein, with respect to equation (3):

$$Y = Y_{pilot} = \begin{bmatrix} y_{1,1} & y_{2,1} & \cdots & y_{12,1} \\ y_{1,2} & y_{2,2} & \cdots & y_{12,2} \end{bmatrix},$$

wherein, for instance, $y_{2,1}$ corresponds to a sample of a pilot symbol, such as a complex IQ sample, of the second subcarrier which is received on the first receiving antenna;

$$A = H = \begin{bmatrix} h_{1,1} & h_{2,1} & h_{3,1} & h_{4,1} \\ h_{1,2} & h_{2,2} & h_{3,2} & h_{4,2} \end{bmatrix},$$

wherein, for instance, $h_{3,2}$ corresponds to a component of a channel estimate of the third user which is received on the second receiving antenna; and, $$Z = \begin{bmatrix} Z_{1,1}e^{j\theta_{1,1}} & Z_{2,1}e^{j\theta_{2,1}} & \cdots & Z_{12,1}e^{j\theta_{12,1}} \\ Z_{1,2}e^{j\theta_{1,2}} & Z_{2,2}e^{j\theta_{2,2}} & \cdots & Z_{12,2}e^{j\theta_{12,2}} \\ Z_{1,3}e^{j\theta_{1,3}} & Z_{2,3}e^{j\theta_{2,3}} & \cdots & Z_{12,3}e^{j\theta_{12,3}} \\ Z_{1,4}e^{j\theta_{1,4}} & Z_{2,4}e^{j\theta_{2,4}} & \cdots & Z_{12,4}e^{j\theta_{12,4}} \end{bmatrix},$$

wherein, for instance, $Z_{12,4}e^{j\theta_{12,4}}$ corresponds to a product between a CAZAC code and a timing error, both associated with the fourth user on the twelfth subcarrier.

The equation (5) can be solved in accordance with equation (4) as already explained above. In an embodiment, the equation (5) can also be solved as:

$$A = Y \times Z^H \times (Z \times Z^H)^{-1} \qquad (6)$$

wherein $(\cdot)^H$ denotes a hermitian transpose operator.

Finally, based on solving the equation (5), the channel estimation unit 130 produces in the frequency domain, a channel estimation data associated with a channel response estimation of the channel. It is to be noted that the produced channel estimation data is determined jointly for each user associated information present within the pilot symbol under study. In the example of FIG. 2 with reference to FIG. 1, where there are more than one pilot symbol, the channel estimation unit 130 is further arranged to average the respective channel estimation data. Hence, a single channel estimate is produced by the channel estimation unit 130.

In embodiments, the equalizing unit 140 is arranged to operate in a first mode, as the conventional equalizing unit, as already explained above, so as to produce an equalized data frequency-despreaded signal. However, in some examples, the equalizing unit 140 is further arranged to operate in a second mode so as to produce, based on at least the matrix $Y_{data}$, the matrix CZi and the matrix H, an equalized data representing an equalized data symbol matrix D which is associated with a data symbol of the received signal. The matrix D is of size N×U, wherein the given number U corresponds to the number of simultaneous users present within a symbol of the received signal. Based on the foregoing and in accordance with the equation (3), the equalizing unit 140 in the second mode of operation is arranged to solve, for one symbol in a slot, the following equation:

$$\begin{bmatrix} y_{1,1} & y_{2,1} & \cdots & y_{12,1} \\ y_{1,2} & y_{2,2} & \cdots & y_{12,2} \end{bmatrix} = \begin{bmatrix} d_{1,1} & d_{2,1} & d_{3,1} & d_{4,1} \\ d_{1,2} & d_{2,2} & d_{3,2} & d_{4,2} \end{bmatrix} \times \qquad (7)$$

-continued $$\begin{bmatrix} Z_{1,1}e^{j\theta_{1,1}}h_{1,1} & \cdots & Z_{12,1}e^{j\theta_{12,1}}h_{12,1} \\ Z_{1,2}e^{j\theta_{1,2}}h_{1,2} & \cdots & Z_{12,2}e^{j\theta_{12,2}}h_{12,2} \\ Z_{1,3}e^{j\theta_{1,3}}h_{1,3} & \cdots & Z_{12,3}e^{j\theta_{12,3}}h_{12,3} \\ Z_{1,4}e^{j\theta_{1,4}}h_{1,4} & \cdots & Z_{12,4}e^{j\theta_{12,4}}h_{12,4} \end{bmatrix}$$

wherein, with respect to equation (3):

$$Y = Y_{data} = \begin{bmatrix} y_{1,1} & y_{2,1} & \cdots & y_{12,1} \\ y_{1,2} & y_{2,2} & \cdots & y_{12,2} \end{bmatrix},$$

wherein, for instance, $y_{2,1}$ corresponds to a sample of a data symbol, such as a complex IQ sample, of the second subcarrier which is received on the first receiving antenna;

$$A = D = \begin{bmatrix} d_{1,1} & d_{2,1} & d_{3,1} & d_{4,1} \\ d_{1,2} & d_{2,2} & d_{3,2} & d_{4,2} \end{bmatrix},$$

wherein, for instance, $d_{3,2}$ corresponds to a component of an equalized data symbol of the third user which is received on the second receiving antenna; and, $$Z = \begin{bmatrix} Z_{1,1}e^{j\theta_{1,1}}h_{1,1} & Z_{2,1}e^{j\theta_{2,1}}h_{2,1} & \cdots & Z_{12,1}e^{j\theta_{12,1}}h_{12,1} \\ Z_{1,2}e^{j\theta_{1,2}}h_{1,2} & Z_{2,2}e^{j\theta_{2,2}}h_{2,2} & \cdots & Z_{12,2}e^{j\theta_{12,2}}h_{12,2} \\ Z_{1,3}e^{j\theta_{1,3}}h_{1,3} & Z_{2,3}e^{j\theta_{2,3}}h_{2,3} & \cdots & Z_{12,3}e^{j\theta_{12,3}}h_{12,3} \\ Z_{1,4}e^{j\theta_{1,4}}h_{1,4} & Z_{2,4}e^{j\theta_{2,4}}h_{2,4} & \cdots & Z_{12,4}e^{j\theta_{12,4}}h_{12,4} \end{bmatrix},$$

wherein, for instance, $$Z_{12,4}e^{j\theta_{12,4}}h_{12,4}$$

corresponds to a product between a CAZAC code, a timing error and a component of a channel estimate which are all associated with the fourth user on the twelfth subcarrier.

The equation (7) can be solved in accordance with equation (4) as already explained above. In an embodiment, the equation (7) can also be solved with equation (6) as already explained above. Finally, based on solving the equation (7), the equalizing unit 140 produces in the frequency domain, an equalized data symbol associated with a data symbol of the received signal. It is to be noted that the produced equalized data symbol is determined jointly for each user associated information present within the data symbol under study.

In embodiments, the processing unit 150 is arranged to command the channel estimation unit 130 and/or the equalizing unit 140 to operate in the second mode of operation. It should be understood that the channel estimation unit 130 may be caused to operate in the second mode of operation while the equalizing unit 140 operates in the first mode of operation. Also, it should be understood that the channel estimation unit 130 may operate in the first mode of operation while the equalizing unit 140 may be caused to operate in the second mode of operation. This makes it clear that the equalization processing of the receiving apparatus 100 may be either based on the matrix H produced by the conventional channel estimator or the channel estimation unit 130 while operating in the second mode of operation. Therefore, from the foregoing, it should understood that without the processing unit 150 causing the channel estimation unit 130 and/or the equalizing unit 140 to operate in the second mode of operation, the receiving apparatus 100 is configured such that the channel estimation unit 130 and/or the equalizing unit 140 operate in the first mode of operation, i.e. as in the conventional receiving apparatus as already explained above.

Figure 3:
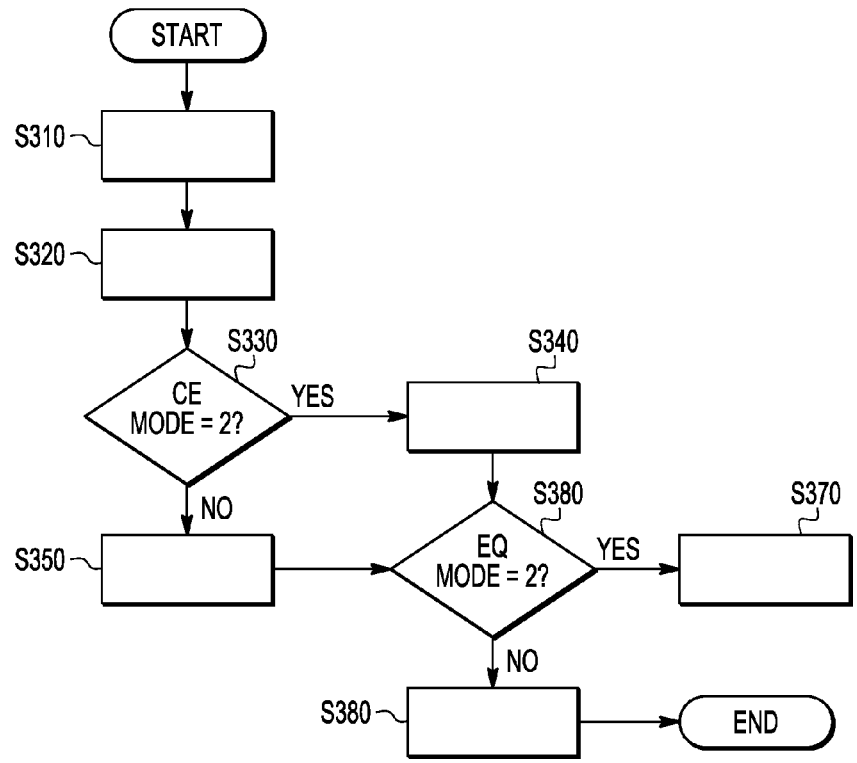
FIG. 3 is a schematic flow diagram of an example of a method of joint user detection.

Referring to FIG. 3, there is diagrammatically shown therein a schematic flow diagram of an example of a method of receiving a signal transmitted over a channel of a communication system. In S310, it is received the signal and it is extracted pilot symbol(s) and data symbol(s), as already described above with reference to the receiving unit 110. In S320, it is obtained for each user information of the pilot symbol a CAZAC code integrating a determined each user information timing impairment (i.e. timing error), as already described above with reference to the timing offset estimation unit 120. In S330, it is tested whether channel estimation should be performed based on the pilot symbol and the integrated CAZAC code obtained at S320, as already described above with reference to the second mode of operation of the channel estimation unit 130. The mode of operation of the channel estimation unit 130 can be caused by a processor such as the processing unit 150, based on control signals, particular bits positioned in a register, for instance. In S340, channel estimation processing is performed in accordance with the second mode of operation of the channel estimation unit 130, as already described above. In S350, channel estimation processing is performed in accordance with the first mode of operation of the conventional channel estimator, as already described above. In S360, it is tested whether equalization should be performed based on the data symbol, the integrated CAZAC code obtained at S320 and a channel estimate, as already described above with reference to the second mode of operation of the equalizing unit 140. As noted above, the equalization process may be based on the channel estimate obtained in S340 or in S350. The mode of operation of the equalizing unit 140 can be caused by a processor such as the processing unit 150, based on control signals, particular bits positioned in a register, for instance. In S370, equalization processing is performed in accordance with the second mode of operation of the equalizing unit 140, as already described above. In S380, equalization processing is performed in accordance with the first mode of operation of the conventional equalizing unit, as already described above.

It has now become clear that the proposed solution brings improvements over conventional receiving apparatuses by allowing joint user channel estimation processing and joint user equalization processing while considering timing impairments of user associated information present within a symbol of a received signal. The proposed solution could be used on conventional receiving apparatuses since both joint user channel estimation processing and joint user equalization processing can be activated independently such that either one or both improvements may be activated as needed or as required by the design of the conventional receiving apparatuses. Advantageously, simulations experiments have shown that quality indicator such as the Block Error Rate (BLER) is improved with the proposed solution in comparison with a conventional receiving apparatus embodying a match filter decoder. Indeed, a gain up to 5 db over such conventional receiving apparatus has been observed. Further, the proposed solution allows multiplexing more users within the same resource or alternatively allows operating the communication channel at low SNR (signal to Noise Ratio).

The above description elaborates examples with regard to a PUCCH channel in its format 2/2a/2b, of a LTE wireless network. However, those skilled in the art of communication systems will readily understand, that RF received signals transmitted over others channels of others wireless networks but embodying the same characteristics as the PUCCH channel in its format 2/2a/2b, in a similar manner. For instance, under certain circumstances the PUCCH channel is its format 1/1a/1b may also be suitable. Indeed, in case where a CAZAC code is shared by more than one user but that the timing error associated with each user is different, then the proposed solution may be used as well.

Figure 4:
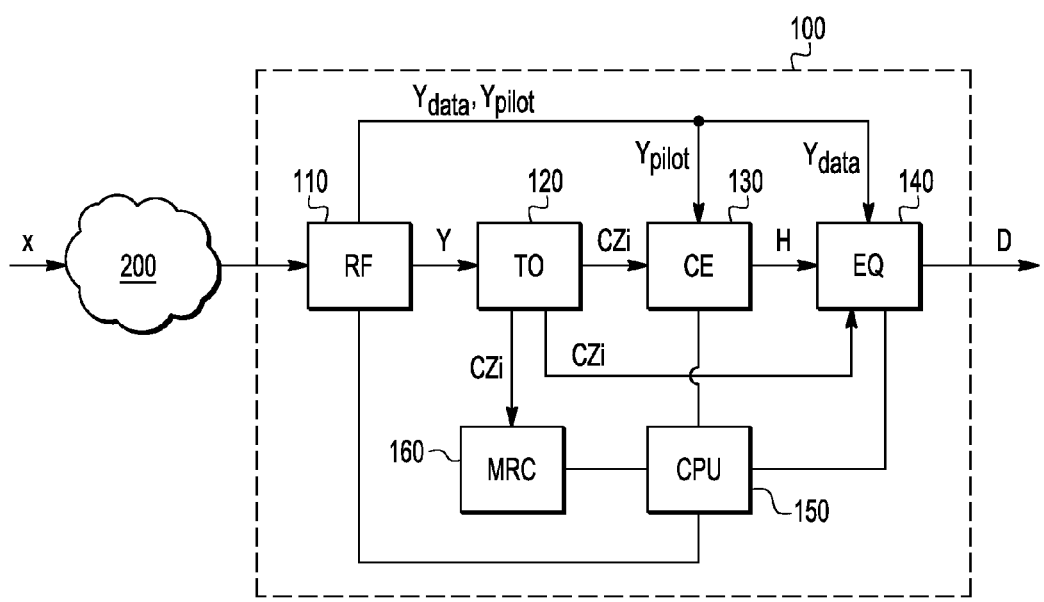
FIGS. 4-5 are examples of joint user detection apparatuses according to other examples.
Figure 5:
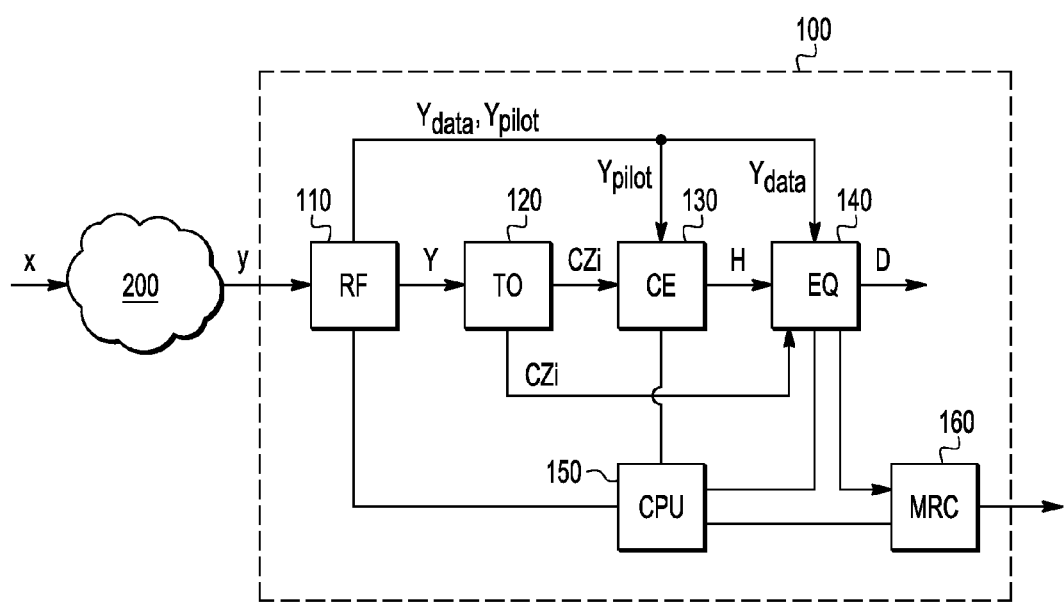

Of course, the above advantages are examples only, and these or other advantages may be achieved by the proposed solution. Further, the skilled person will appreciate that not all advantages stated above are necessarily achieved by embodiments described herein. For instance, where the receiving unit 110 of the receiving apparatus 100 comprises more than one receiving antennas, conventional combining techniques such as Maximum Ratio Combining (MRC) technique may be used to combine the obtained results over the plurality of antennas. A corresponding MRC unit may be included in the receiving apparatus of FIG. 3. In the example of FIG. 4, a MRC unit 160 is operably coupled to the timing offset estimation unit 120 and the processing unit. In FIG. 4, the MRC unit is arranged to combine the integrated CAZAC codes over a plurality of receiving antennas. Later on, channel estimation processing may performed based on the combined integrated CAZAC codes. In the example of FIG. 5, a MRC unit 160 is operably coupled to the equalizing unit 120 and the processing unit. In FIG. 5, the MRC unit is arranged to combine the equalized data symbols over a plurality of receiving antennas. Of course, the skilled person could contemplated other arrangements of the receiving apparatus of FIG. 2 including a MRC unit.

The proposed solution may also be implemented in a computer program product stored in a non-transitory computer-readable storage medium that stores computer-executable code which causes a processor computer to perform the operation of the receiving apparatus 100 and/or the example of a method as illustrated in the foregoing description, for instance.

A computer program product is a list of instructions such as a particular application program and/or an operating system. The computer program may for example include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory unit storage media including semiconductor-based memory units such as FLASH memory, EEPROM, EPROM, ROM; ferromagnetic digital memories;

MRAM; volatile storage media including registers, buffers or caches, main memory, RAM, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as an operation to users and programs of the system.

The computer system may for example include at least one processing unit, associated memory unit and a number of input/output (I/O) devices. When executing the computer program, the computer system processes information according to the computer program and produces resultant output information via I/O devices.

In the foregoing specification, the proposed solution has been described with reference to specific examples of embodiments of the proposed solution. It will, however, be evident that various modifications and changes may be made therein without departing from the broader scope of the proposed solution as set forth in the appended claims. For instance, it has been described that the integration of the timing error with the respective CAZAC code was performed by the timing offset estimation unit 120. However, it can also be contemplated cases where such processing is performed by the processing unit 150 if the latter is operably coupled to the timing offset unit 120. In that case, the timing offset estimation unit would be a conventional time tracking estimator. Still further, although the LTE radio communications system is described as an example in the foregoing examples of embodiment, the present invention is not limited to LTE radio communications systems but also can be applied other radio communications systems that include a plurality of receiving antennas Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely examples, and that in fact many other architectures may be implemented which achieve the same functionality.

Any arrangement of devices to achieve the same functionality is effectively "associated" such that the desired functionality is achieved. Hence, any two devices herein combined to achieve a particular functionality may be seen as "associated with" each other such that the desired functionality is achieved, irrespective of architectures or intermediate devices. Likewise, any two devices so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple examples of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the proposed solution is not limited to physical devices or units implemented in nonprogrammable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or operations then those listed in a claim. Furthermore, the terms "a" or "an," as used herein, are defined as one or as more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An apparatus comprising:
a receiving unit arranged to receive a signal transmitted over a channel of a wireless communication system, the received signal comprising at least one data symbol and at least one pilot symbol, each symbol of the received signal comprising user associated information which are orthogonally multiplexed in the frequency domain with a unique cyclically shifted version of a known code exhibiting constant-amplitude zero autocorrelation, CAZAC, property;
a timing offset estimation unit operably coupled to the receiving unit and arranged to:
determine a timing offset estimation data associated with timing impairment of user associated information; and,
integrate the determined timing offset estimation data with the respective CAZAC code, thereby producing an integrated CAZAC code;
a channel estimation unit operably coupled to the receiving unit and the timing offset unit, the channel estimation unit being arranged to produce in the frequency domain, a channel estimation data associated with a channel response estimation of the channel;
an equalizing unit operably coupled to the receiving unit, the timing offset unit and the channel estimation unit, the equalizing unit being arranged to produce in the frequency domain, an equalized data symbol associated with the data symbol; and, a processing unit such as a processor, operably coupled to the channel estimation unit and the equalizing unit, the processing unit being arranged to command the channel estimation unit and/or the equalizing unit to operate based on at least one symbol of the received signal and the associated integrated CAZAC code.

2. The apparatus of claim 1, wherein the channel estimation unit is arranged to produce the channel estimation data based on the pilot symbol, the channel estimation data corresponding to a product between:
a matrix representation of the pilot symbol; and,
the inverse of a matrix representation of the integrated CAZAC code.

3. The apparatus of claim 1, wherein the equalizing unit is arranged to produce the equalized data symbol based on the data symbol, the equalized data symbol corresponding to a product between:
a matrix representation of the data symbol; and,
the inverse of a matrix representation of a product between the integrated CAZAC code and the channel estimation data.

4. The apparatus of claim 2 further comprising:
a plurality of receiving antennas being operably coupled the receiving unit;
a maximum ratio combining unit being operably coupled to the timing offset estimation unit and the processing unit;
the processing unit being operably coupled to the receiving unit;
wherein, when the signal is received on the plurality of antennas, the processing unit is further arranged to command:
the receiving unit to process individually the signal received on each of the plurality of receiving antennas;
the maximum ratio combining unit to perform maximum ratio combining processing based on the data symbol and associated integrated CAZAC code, associated with each of the plurality of receiving antennas, thereby producing a combined data symbol and associated combined integrated CAZAC code;
wherein the equalizing unit is arranged to produce the equalized data symbol based on the combined data symbol and associated combined integrated CAZAC code, the equalized data symbol corresponding to a product between:
a matrix representation of the combined data symbol; and,
the inverse of a matrix representation of a product between the associated combined integrated CAZAC code and the channel estimation data.

5. The apparatus of claim 2 further comprising:
a plurality of receiving antennas being operably coupled the receiving unit;
a maximum ratio combining unit being operably coupled to the equalizing unit and the processing unit;
the processing unit being operably coupled to the receiving unit;
wherein, when the signal is received on the plurality of antennas, the processing unit is further arranged to command:
the receiving unit to process individually the signal received on each of the plurality of receiving antennas;
the maximum ratio combining unit to perform maximum ratio combining processing based on the equalized data symbol, associated with each of the plurality of receiving antennas, thereby producing a combined equalized data symbol.

6. The apparatus of claim 1, wherein the integrated CAZAC code corresponds to a Zadoff-Chu sequence.

7. The apparatus of claim 6 wherein the channel is a LTE Physical Uplink Control Channel, PUCCH.

8. A method comprising:
receiving a signal transmitted over a channel of a wireless communication system, the received signal comprising at least one data symbol and at least one pilot symbol, each symbol of the received signal comprising user associated information which are orthogonally multiplexed in the frequency domain with a unique cyclically shifted version of a known code exhibiting constant-amplitude zero autocorrelation, CAZAC, property;
determining a timing offset estimation data associated with timing impairment of user associated information;
integrating the determined timing offset estimation data with the respective CAZAC code, thereby producing an integrated CAZAC code;
producing in the frequency domain, a channel estimation data associated with a channel response estimation of the channel;
producing in the frequency domain, an equalized data symbol associated with the data symbol; and,
causing the producing of the channel estimation data and/or the an equalized data symbol to be based on at least one symbol of the received signal and the associated integrated CAZAC code.

9. The method of claim 8, wherein producing the channel estimation data is based on the pilot symbol, the channel estimation data corresponding to a product between:
a matrix representation of the pilot symbol; and,
the inverse of a matrix representation of the integrated CAZAC code.

10. The method of claim 8, wherein producing the equalized data symbol is based on the data symbol, the equalized data symbol corresponding to a product between:
a matrix representation of the data symbol; and,
the inverse of a matrix representation of a product between the integrated CAZAC code and the channel estimation data.

11. The method of claim 9 further comprising:
providing a plurality of receiving antennas;
wherein, when the signal is received on the plurality of antennas, the method further comprises:
processing individually the signal received on each of the plurality of receiving antennas;
perform a maximum ratio combining processing based on the data symbol and associated integrated CAZAC code, associated with each of the plurality of receiving antennas, thereby producing a combined data symbol and associated combined integrated CAZAC code;
wherein, when the producing of the equalized data symbol is based on the combined data symbol and associated combined integrated CAZAC code, the equalized data symbol corresponds to a product between:
a matrix representation of the combined data symbol; and,
the inverse of a matrix representation of a product between the associated combined integrated CAZAC code and the channel estimation data.

12. The method of claim 9 further comprising:
providing a plurality of receiving antennas;
wherein, when the signal is received on the plurality of antennas, the method further comprises:
  processing individually the signal received on each of the plurality of receiving antennas;
  performing a maximum ratio combining processing based on the equalized data symbol, associated with each of the plurality of receiving antennas, thereby producing a combined equalized data symbol.

13. The method of claim 8, wherein the integrated CAZAC code corresponds to a Zadoff-Chu sequence.

14. The method of claim 13 wherein the channel is a LTE Physical Uplink Control Channel, PUCCH.

15. A computer program product stored in a tangible, non-transitory computer-readable storage medium that stores computer-executable code for joint user detection for a wireless communication system, the computer-executable process causing a processor computer to perform the method according to claim 8.

\* \* \* \* \*